United States Patent [19]
Althaus

[11] 3,895,777
[45] July 22, 1975

[54] GATE VALVE
[76] Inventor: Earl G. Althaus, 3208 Jacks Ln., Louisville, Ky. 40216
[22] Filed: Sept. 26, 1974
[21] Appl. No.: 509,718

[52] U.S. Cl. ............................................. 251/203
[51] Int. Cl.² ........................................ F16K 25/00
[58] Field of Search ............ 251/195, 203, 202, 328

[56] References Cited
UNITED STATES PATENTS

| | | | |
|---|---|---|---|
| 2,870,987 | 1/1959 | Greenwood | 251/328 X |
| 3,033,516 | 5/1962 | Williams | 251/328 R |
| 3,168,281 | 2/1965 | Yates | 251/195 X |
| 3,339,886 | 9/1967 | Grove | 251/195 X |

FOREIGN PATENTS OR APPLICATIONS

| | | | |
|---|---|---|---|
| 1,183,648 | 1/1959 | France | 251/203 |

Primary Examiner—Harold W. Weakley

[57] ABSTRACT

A gate valve employs a tapered metal gate that is vertically movable relative to a metal valve seat secured within the valve body, and a plug with one or more resilient lugs secured within the valve body for cooperation with the metal gate. One face of the gate and the metal valve seat define a metal-to-metal seal for shutting off the flow of fluid through the flow passage within valve body, while the lug, or lugs, press against the opposite face of the gate and cam the gate into leak-proof sealing engagement with the valve seat. The plug compensates for slight irregularities in the finish of the gate and valve seat as well as for wear attributable to repeated usage. Due to the simplified design of the valve, such valve can be periodically serviced while on-line in the field with attendant economies.

6 Claims, 7 Drawing Figures

PATENTED JUL 22 1975    3,895,777

GATE VALVE

BACKGROUND OF THE INVENTION

1. Field of the Invention

This invention relates generally to gate valves, and more particularly to a simplified, unique internal construction therefor.

2. Description of the Prior Art

The desirability of providing a gate valve that could be easily serviced in the field without removing such valve from its operative position on a flow line has long been recognized. Servicing of the gate valves in the field obviates the necessity for shutting down the flow line, disconnecting the gate valve, which may be a large and cumbersome unit, installing a new or reconditioned valve, starting up the flow line once again, and then returning the gate valve that has been removed to the shop for repair.

The attempts to fabricate a gate valve of a simplified, economic design that could be serviced in the field are too numerous to categorize. However, one illustrative approach is set forth in U.S. Pat. No. 1,367,506, granted Feb. 1, 1921 to Joseph Rothchild. Such patent discloses a valve body, a tapered gate with an aperture extending therethrough, a tapered metallic guide which cooperates with one face of the gate, and a valve seat that cooperates with the opposite face of the gate. The valve seat assumes the form of a circular block with a projecting stud, said stud being received within a crossbar located within the valve body. In the closed position of the gate, the circular block closes the aperture in the gate valve, while in the opened position of the gate, the fluid flows through the aperture and around the block.

While the valve configuration disclosed by Rothchild may well have compensated for irregularities in the finish of the valve components and for play in the components attributable to continued wear, such configuration relied upon a narrow annular area of contact between the block and the aperture in the gate that may well have permitted leakage of fluid. Also, such configuration called for a cross-arm to be formed in the valve body, and a stud to be secured to one face of the block; obviously, these components introduced an undesirable additional cost factor into the manufacturing cost for the valve disclosed by Rothchild. Furthermore, the block in the Rothchild patent is situated at all times in the path of fluid flow through the valve body, and the block thus limits the capacity and effectiveness of such valve at high flow rates.

SUMMARY OF THE INVENTION

Thus, with the deficiencies of the prior art valves discussed above clearly in mind, the instant invention contemplates a gate valve of simplified design that relies upon a leak-proof metal-to-metal seal to shut off fluid flow therethrough and utilizes a plug with resilient lugs to compensate for irregularities in the abutting surfaces attributable to repeated usage and/or flaws in surface finishes. Due to these constructional features, the gate valve disclosed hereinafter is inexpensive to manufacture and yet can be welded into fixed position on a flow line for repeated servicing in the field.

Other operational advantages attributable to the instant gate valve will become readily apparent to the artisan when the specification is construed in harmony with the appended drawings.

DESCRIPTION OF THE PREFERRED EMBODIMENT

Figure 1:
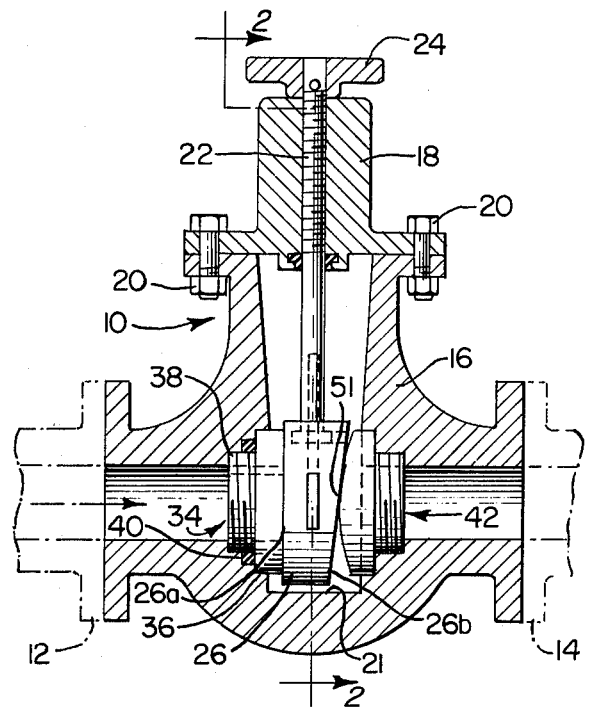
FIG. 1 is a vertical cross-sectional view of a gate valve constructed in accordance with the principles of the instant invention, the gate being shown in closed position.
Figure 3:
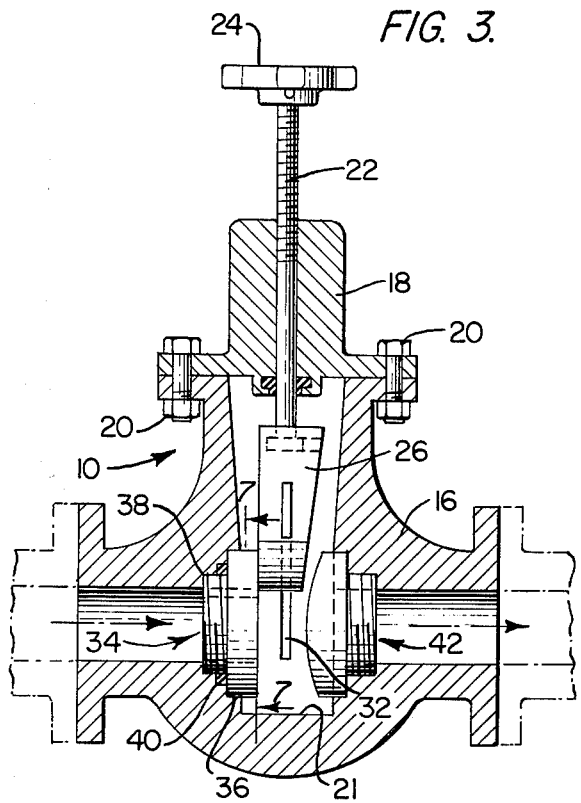
FIG. 3 is a view similar to FIG. 1, but showing the gate in its opened position.
Figure 2:
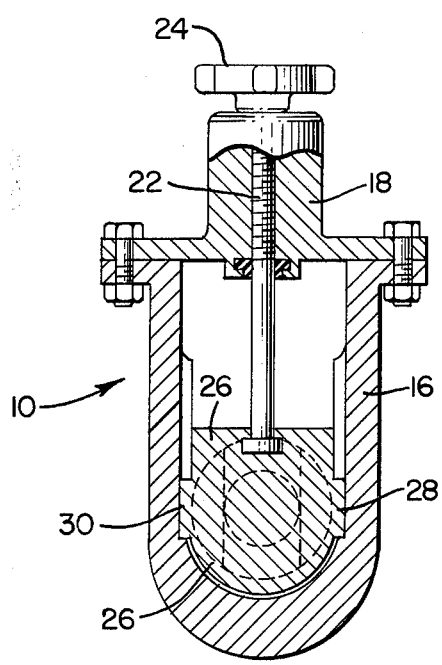
FIG. 2 is another vertical cross-sectional view of the gate valve of FIG. 1, such view being taken along line 2—2 in FIG. 1 and in the direction indicated.

Referring now to the drawings, FIGS. 1–3 depict a gate valve, indicated generally by reference numeral 10, that controls the flow of fluid passing between first pipe 12 and second pipe 14. Valve 10 includes a valve body 16 with annular passages to permit flow therethrough, and a bonnet 18 that is bolted, as at 20, to the valve body. An enlarged cavity 21 is formed in the center part of the body 16. An externally threaded stem 22 extends vertically through the bonnet 18, and is advanced relative to the bonnet and the central cavity by rotation of manual operator 24. The lower end of the stem 22 fits into a recess at the upper end of metal gate 26, which has a wedge-shaped body, so that rotation of operator 24 controls the vertical adjustment of gate 26 in the conventional manner. The downstream face of gate 26 is designated as 26a, while the tapered, upstream face of the gate is designated as 26b. Tabs 28 and 30, situated on the opposite lateral edges of the gate ride in grooves 32 formed in the interior surfaces of the valve body 16 to insure accurate vertical movement of the gate 26.

Figure 7:
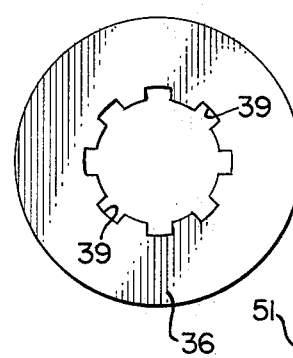
FIG. 7 is a vertical cross-sectional view of the valve seat, such view being taken along line 7—7 in FIG. 3.

A thimble-shaped valve seat, indicated generally by reference numeral 34, cooperates with the downstream face 26a of gate 26 to control the fluid flow through valve body 16. Seat 34 comprises an enlarged annular seat 36 and a hollow body member 38 that is externally threaded. A gasket or O-ring 40 is seated on the shoulder formed between seat 36 and body member 38. The threads on member 38 may be of sufficient strength so that such member can form its own threads in the valve body 16 as it is rotated into position therewith, i.e., the threads may be self-tapping in nature. Alternatively, the interior surface of the valve body may be threaded so as to accept the member 38 and secure the seat 36 in fixed position, or wrench flats 39 may be formed in the member 38 so that simple manual tools, such as spanner wrenches, can be utilized in the installation process; the flats are best shown in FIG. 7. Gasket or O-ring 40 prevents leakage past the valve seat and absorbs some of the sealing pressure when the gate is lowered into closed position. Seat 36 and body member 38, it should be noted, are executed in metal, so that a metal-to-metal seal is formed at the interface between the seat 36 and the downstream face 26a of gate 26. In lieu of resilient O-ring 40, a copper gasket could be used when the valve is employed to handle molten materials and/or high pressures.

Figure 4:
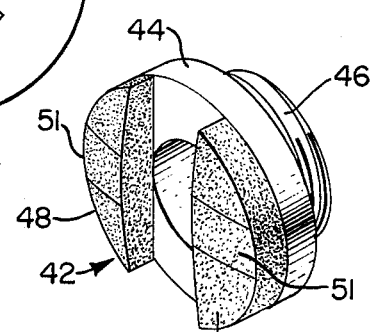
FIG. 4 is a perspective view, on an enlarged scale, of the plug with resilient lugs secured thereto.

FIG. 4 illustrates the plug, indicated generally by reference numeral 42, that cooperates with the upstream face 26b of gate 26. Plug 42 also has a thimble-like shape and comprises an annular member 44 and an externally threaded body member 46. The threads on the body member 46 may be self-tapping in nature, or alternatively, threads may be formed in the interior of valve body 16 to cooperate with the threads on member 46. A pair of resilient lugs 48, 50 are secured to the annular member 44; the lugs may have a slight convex curvature, when viewed in side elevation, or as shown in FIGS. 1 and 3, may assume the form of disc-like fragments. In either instance, the configuration of the lugs may be interrupted by a flat portion that follows the taper of face 26b of gate 26 so that a zone 51 of contact, rather than a point-to-point contact, is formed between the lugs and the tapered surface 26b of the gate valve 26. Additionally, the lugs are secured to member 44, in a vertical orientation, on opposite sides of the passageway defined through the plug, so that said lugs do not impede the flow of fluid through the valve body, even at full flow conditions.

In operation, as gate 26 is lowered by rotation of operator 24, the upstream, or tapered, side 26b of gate 26 rides downwardly along lugs 48, 50 and presses thereagainst. The resilient lugs exert a camming force upon the gate and assist in forcing the downstream, or planar, face 26a of the gate into a leak-proof, metal-to-metal seal with valve seat 34. In addition to producing a superior seal, the lugs compensate for play introduced into the valve by repeated usage and by irregularities or imperfections in the machining of the interfacing metal parts.

When the valve 10 is periodically serviced as part of a preventive maintenance program, flow through the line is shut off or diverted and then bonnet 18 is unbolted from valve body 16. Gate 26 is withdrawn from the valve body 16, and valve seat 34 and plug 42 are unscrewed from their engagement with the valve body 16. In some instances, the valve seat 34 and the plug 42 may not be freed by hand, and simple manual tools, such as spanner wrenches and/or screwdrivers, may have to be utilized. If either member appears to be worn, it may either be repaired in the field, or more likely, it can be replaced with a new component. After the valve seat 34 and plug 42 have been screwed into position, the bonnet and gate are replaced and the valve is ready for continued operation.

Figure 5:
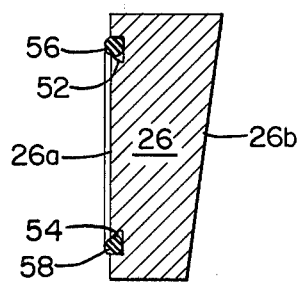
FIG. 5 is a side elevational view of the gate of FIGS. 1–3, but showing details of a first alternative sealing arrangement.

FIG. 5 shows gate 26 in side elevation to reveal shallow grooves 52, 54 in the upstream face 26a of the gate. Resilient O-rings or washers 56, 58 are positioned in the grooves to facilitate the downward travel of metal gate 26 over metal seat 36, while not interfering with the metal-to-metal seal established when gate 26 reaches its fully bottomed position.

Figure 6:
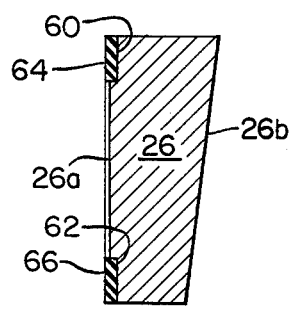
FIG. 6 is a view similar to FIG. 5, but showing details of a second sealing arrangement.

FIG. 6 depicts gate 26 in side elevation to reveal an alternative sealing arrangement. In lieu of shallow grooves 52, 54, the gate valve of FIG. 6 has notches 60, 62 removed from its upper and lower ends of its upstream face 26a. Rubber seals 64, 66 are positioned within said notches and serve a function identical to that performed by washers 56, 58.

FIG. 7, as previously mentioned, shows the radially extending wrench flats 39 spaced about the interior wall of the annular seat 36 of thimble-shaped valve seat 34.

Manifestly, changes and modifications may be made in the unique components employed within the instant gate valve, and in the materials from which such components can be fabricated. Hence, the claims that define the metes and bounds of this invention should be broadly construed in a manner commensurate with the scope of the invention.

I claim:

1. A gate valve comprising:
    a. a valve body having a horizontal flow passage extending therethrough and an enlarged central cavity in communication with said flow passage,
    b. a valve seat secured in fixed position within said flow passsage,
    c. a gate vertically moveable within said cavity in said valve body,
    d. said gate having a wedge-shaped body with a vertically extending planar face and a tapered face,
    e. operating means for moving said gate relative to said valve seat so that said planar face contacts said valve seat to regulate the flow through the valve body,
    f. plug means secured in fixed position within said flow passage, and
    g. said plug means including at least one resilient lug that contacts the tapered face of said gate as said gate is moved downwardly to thereby cam the planar face of said gate against said valve seat.

2. The gate valve as defined in claim 1 wherein said lug has a flat portion, when viewed in side elevation, that enables said gate valve to form a zone of contact therewith.

3. The gate valve as defined in claim 1 wherein said plug means has an axial passageway to permit flow therethrough, and a pair of lugs are employed for said plug means, one lug being secured to said plug means on each side of said passageway.

4. The gate valve as defined in claim 1 wherein said lug is vertically oriented.

5. The gate valve as defined in claim 1, wherein said valve seat includes an annular, metal seat and said gate is executed in metal, so that a metal-to-metal seal is formed at the interface of said seat and said gate.

6. The gate valve as defined in claim 1 wherein said valve seat and said plug means are externally threaded for engagement with the interior surfaces of said valve body, said valve seat and said plug means being removable and replaceable when said valve is serviced.

* * * * *